Figure 12:
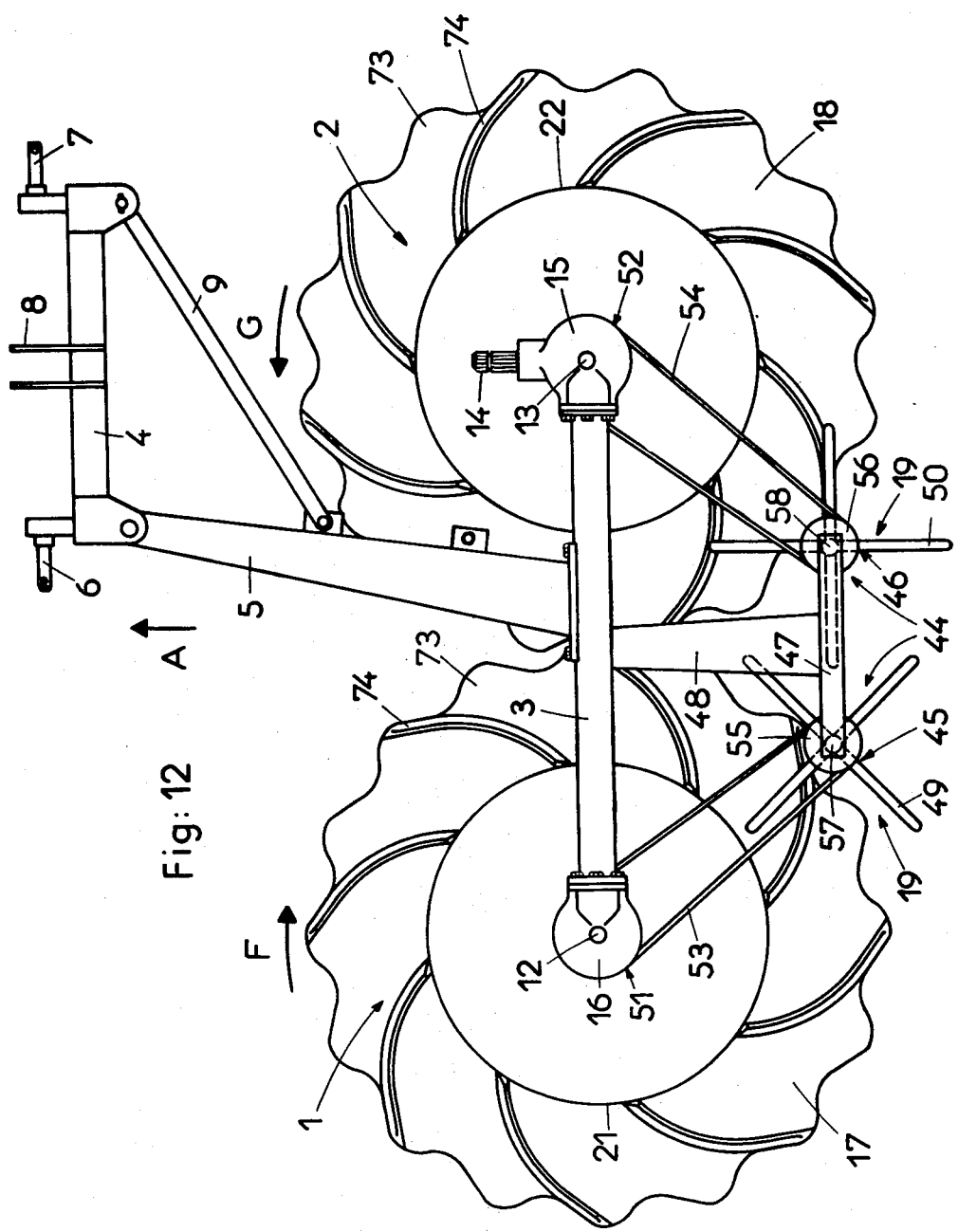

United States Patent [19]
Wattron et al.

[11] 4,453,376
[45] * Jun. 12, 1984

[54] AGRICULTURAL MACHINE FOR THE TEDDING OR CONDITIONING OF FODDER

[75] Inventors: Albert Wattron, Schwenheim; Michel Quirin, Allenwiller, both of France

[73] Assignee: Belrecolt S.A., Marmoutier, France

[*] Notice: The portion of the term of this patent subsequent to Apr. 19, 2000 has been disclaimed.

[21] Appl. No.: 453,629

[22] Filed: Dec. 27, 1982

Related U.S. Application Data

[63] Continuation of Ser. No. 215,854, Dec. 12, 1980, Pat. No. 4,380,142.

[30] Foreign Application Priority Data

Dec. 20, 1979 [FR] France .................. 79 31888

[51] Int. Cl.³ .......................................... A01D 49/00
[52] U.S. Cl. ................................................ 56/370
[58] Field of Search ............... 56/370, 376, 377, 192, 56/DIG. 1

[56] References Cited

U.S. PATENT DOCUMENTS

| | | | |
|---|---|---|---|
| 3,699,755 | 10/1972 | Hauser | 56/DIG. 1 |
| 4,023,335 | 5/1977 | van der Lely | 56/370 |
| 4,094,132 | 6/1978 | DeCoene et al. | 56/192 |
| 4,117,653 | 10/1978 | Tarver, Jr. | 56/192 |
| 4,128,987 | 12/1978 | Zweegers | 56/370 |
| 4,187,664 | 2/1980 | Meek et al. | 56/192 |
| 4,203,277 | 5/1980 | Kaetzel | 56/370 |
| 4,269,019 | 5/1981 | Strobel | 56/370 |

FOREIGN PATENT DOCUMENTS

| | | |
|---|---|---|
| 2421101 | 11/1975 | Fed. Rep. of Germany ... 56/DIG. 1 |
| 2730211 | 2/1978 | Fed. Rep. of Germany ... 56/DIG. 1 |

*Primary Examiner*—Jay N. Eskovitz
*Attorney, Agent, or Firm*—Ernest F. Marmorek

[57] ABSTRACT

An agricultural machine for the tedding or conditioning of fodder comprises a pair of drums (1,2) rotatable about shafts (12,13) which are slightly inclined in the forwards direction of travel (A) of the machine. The drums (1,2) are interconnected by a chassis (3) which is connected to a coupling member (4) by a connecting beam (5). The coupling member (4) has attachment points (6,7,8) for coupling the machine to a tractor. Each drum (1,2) carries at its lower portion a flexible, deformable skirt (17,18) for grasping and transporting the fodder. The skirts are associated with tedding or conditioning means which may comprise ribs (20) on the upper surfaces of the skirts (17,18) or other means (not shown).

14 Claims, 19 Drawing Figures

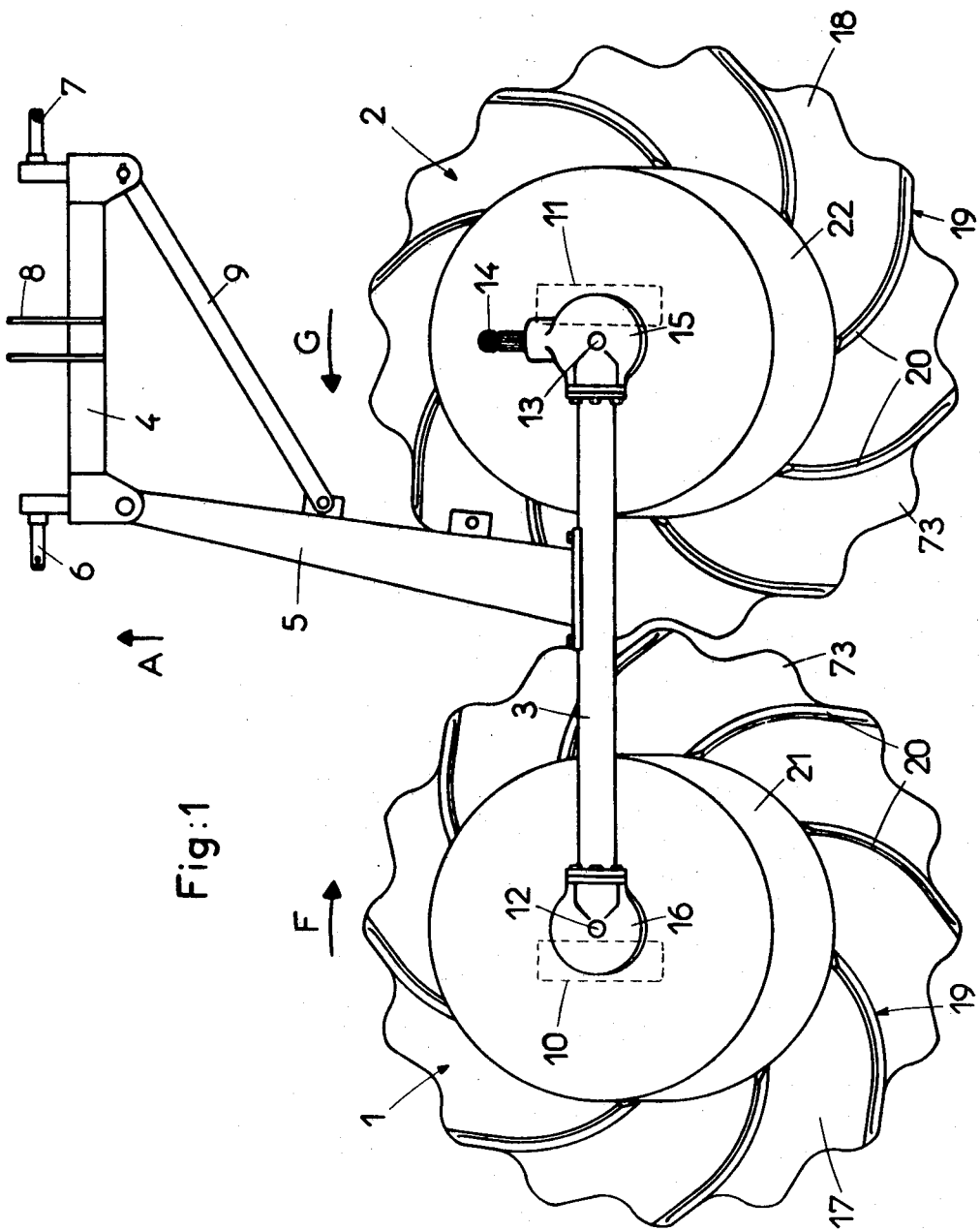
Fig:1

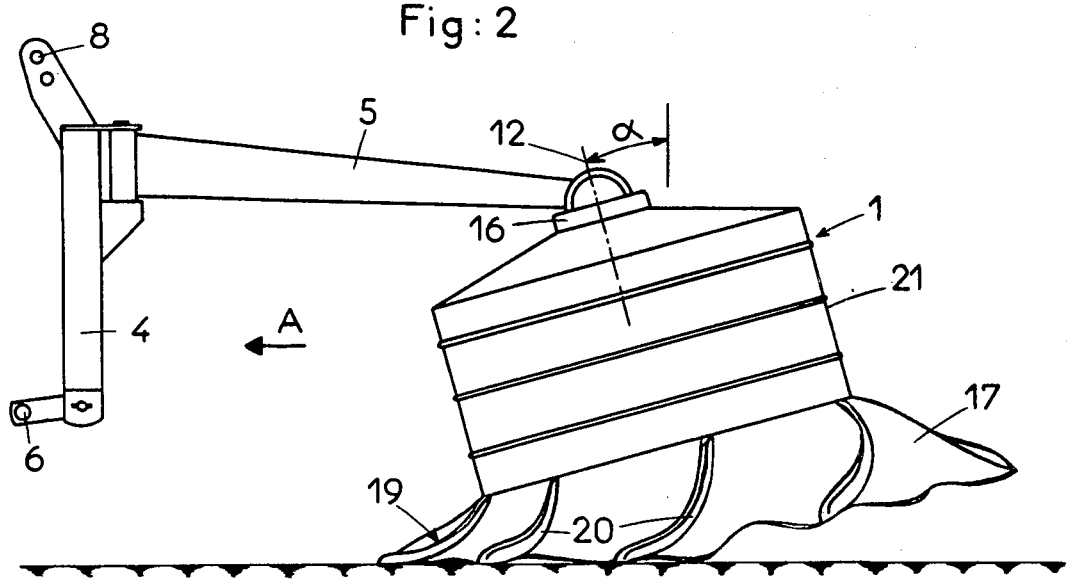
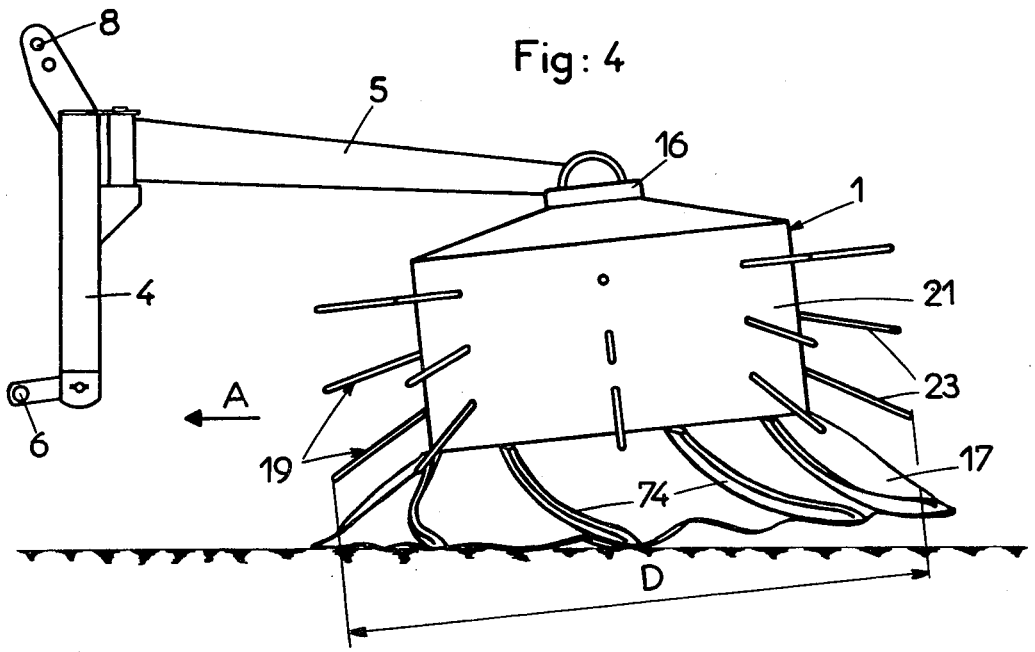

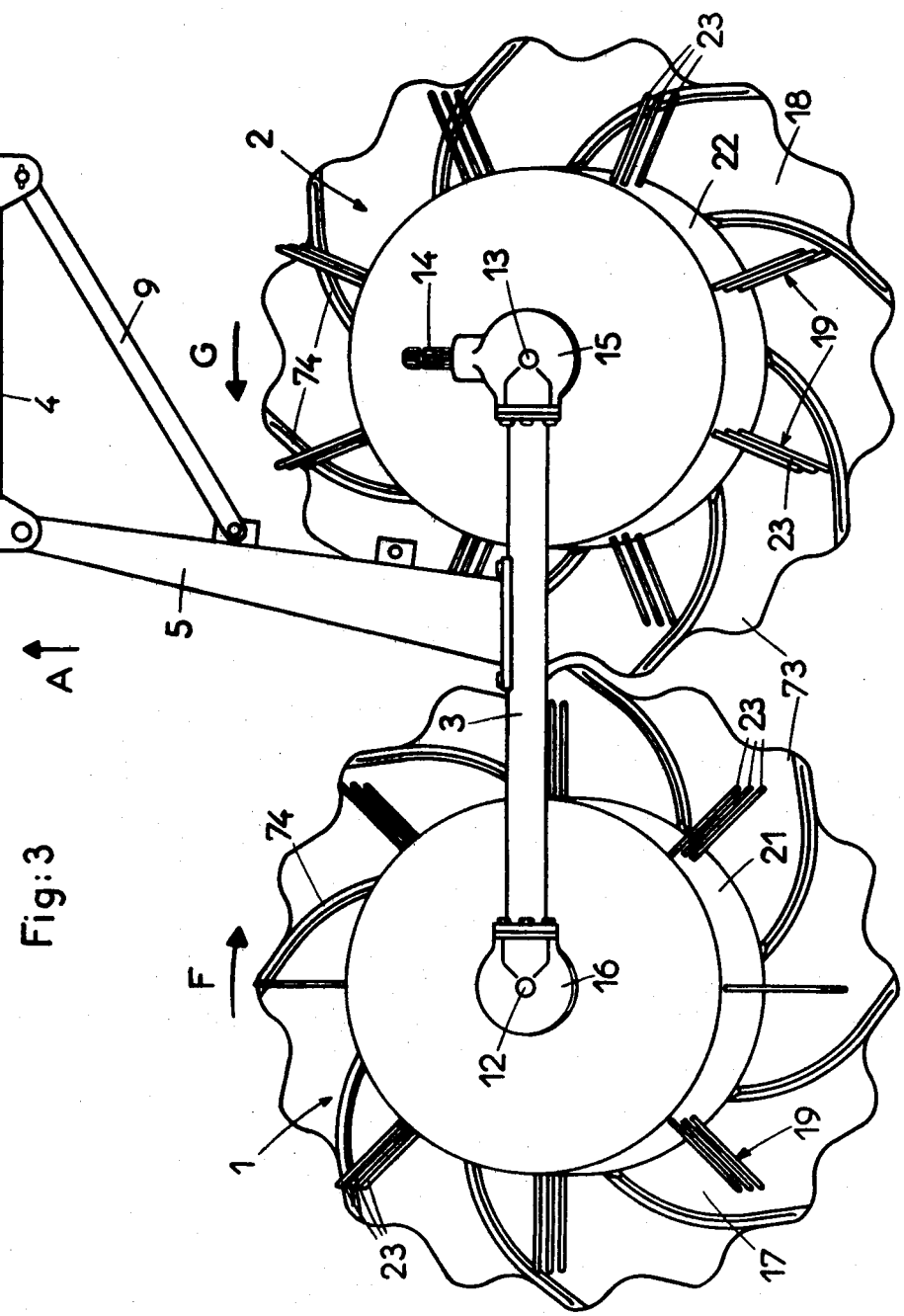
Fig:3

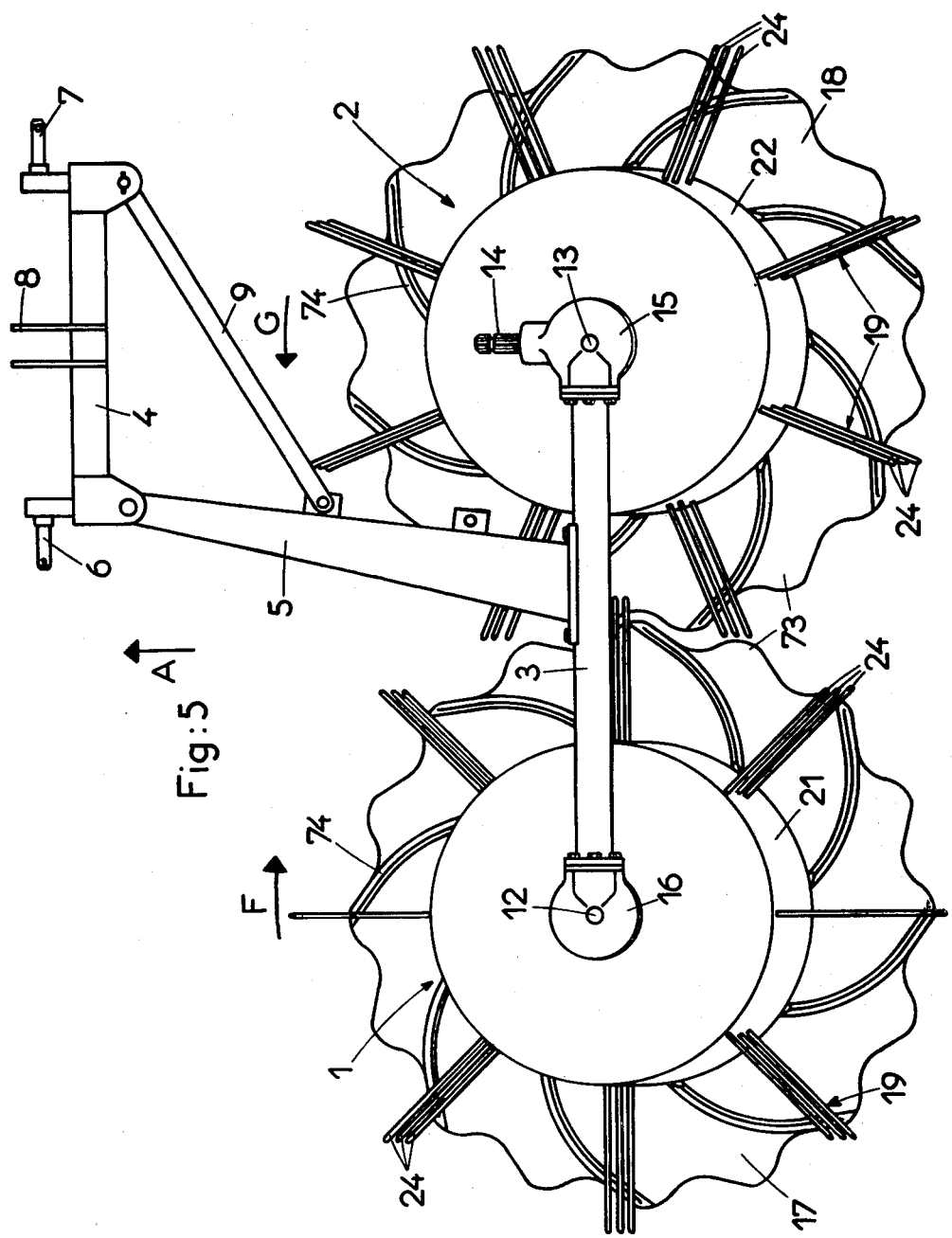

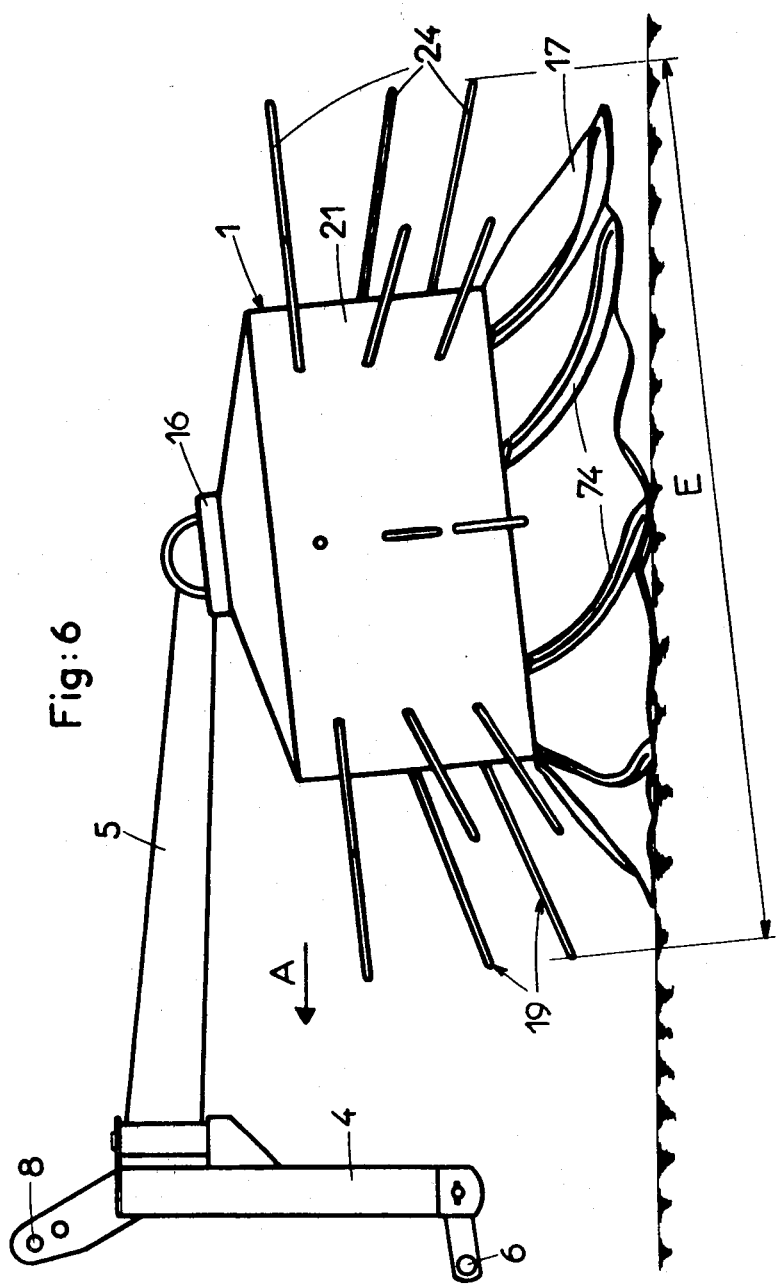

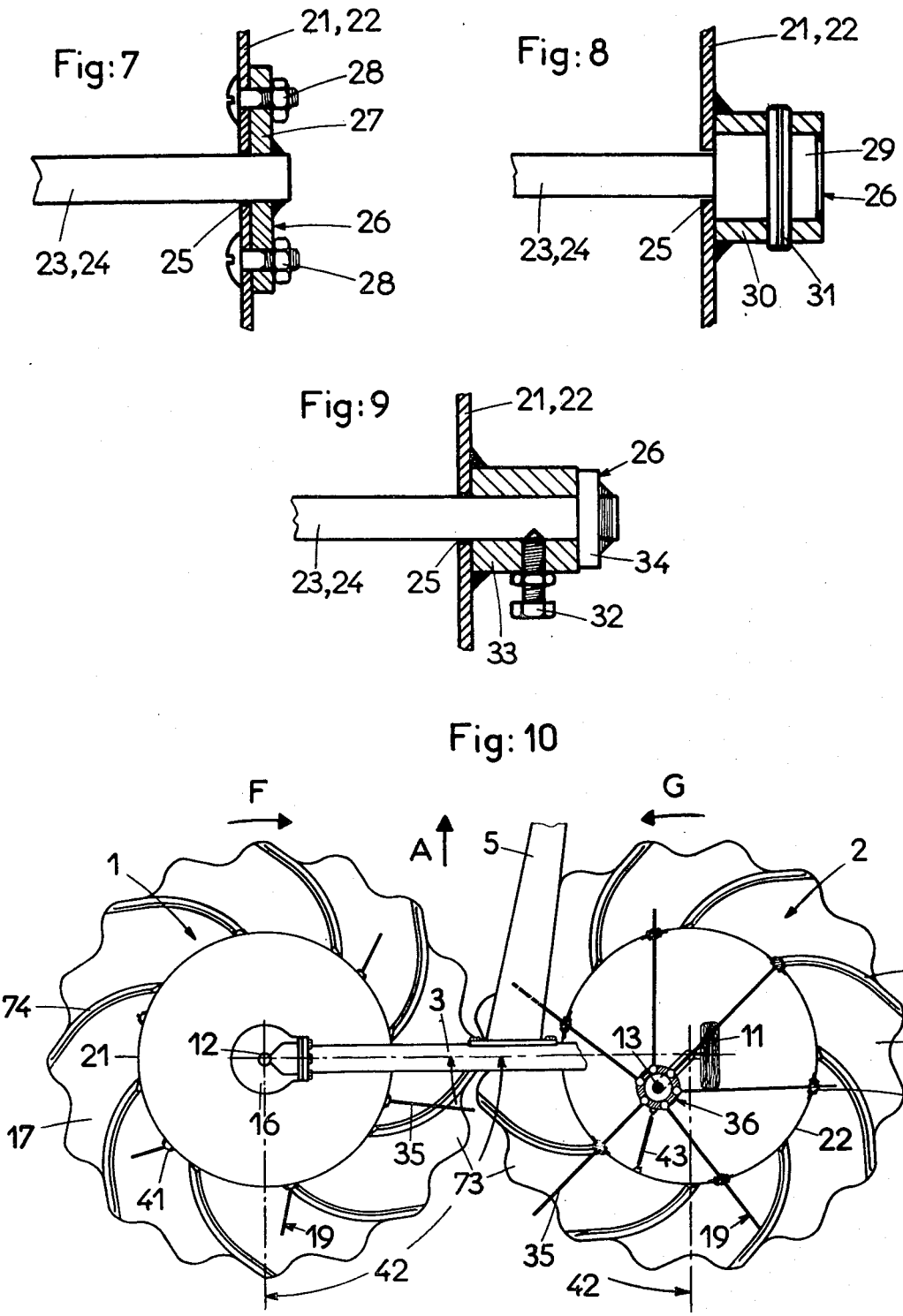

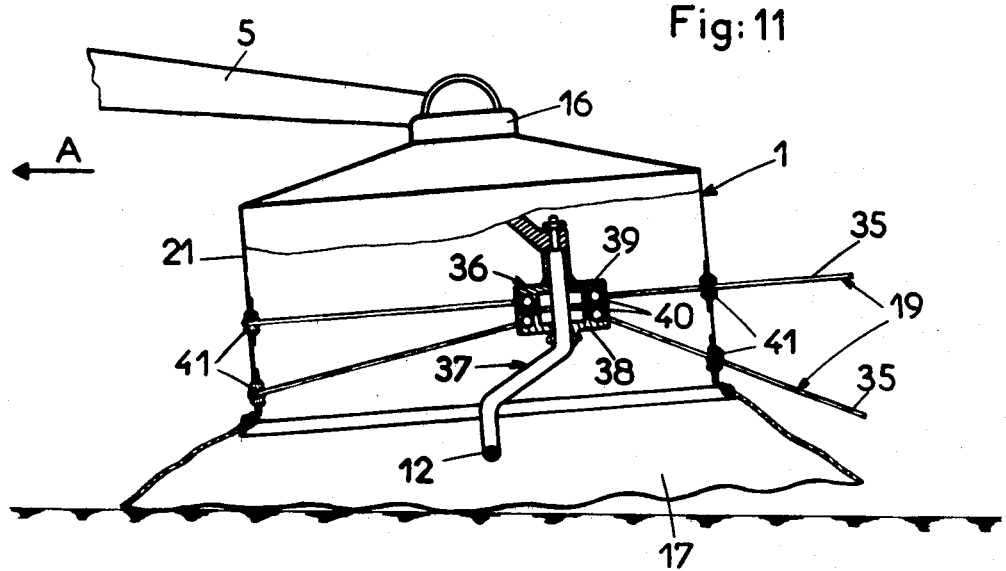
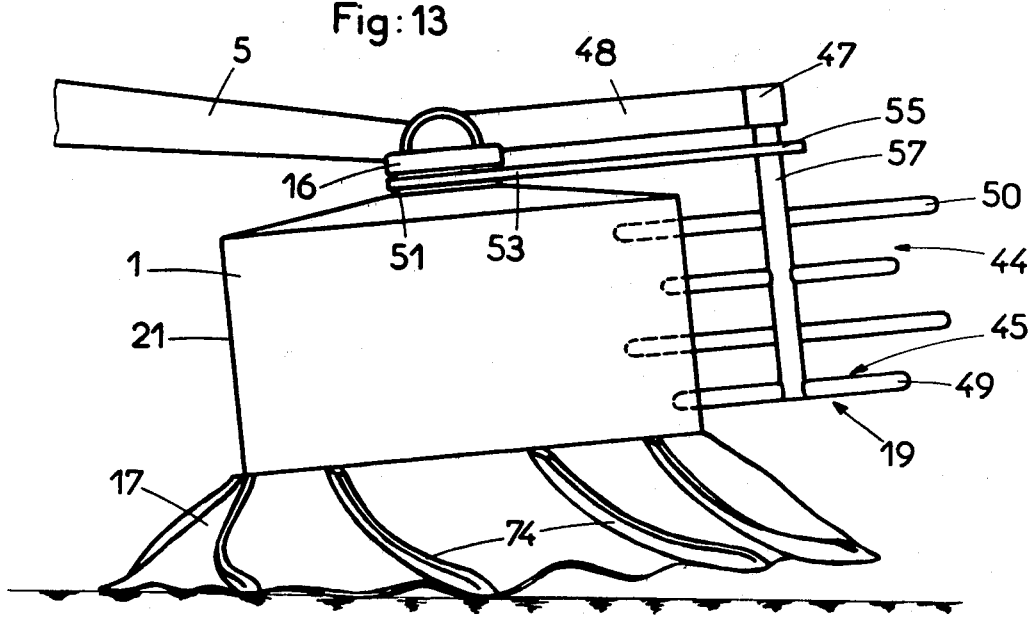

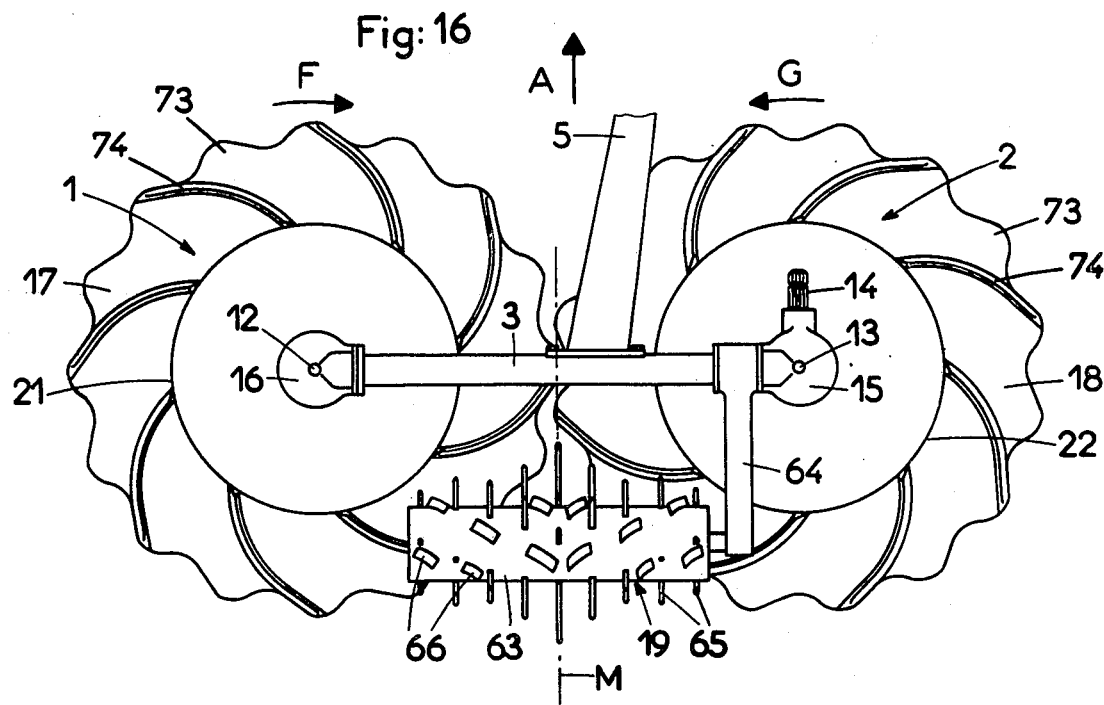
Fig: 16
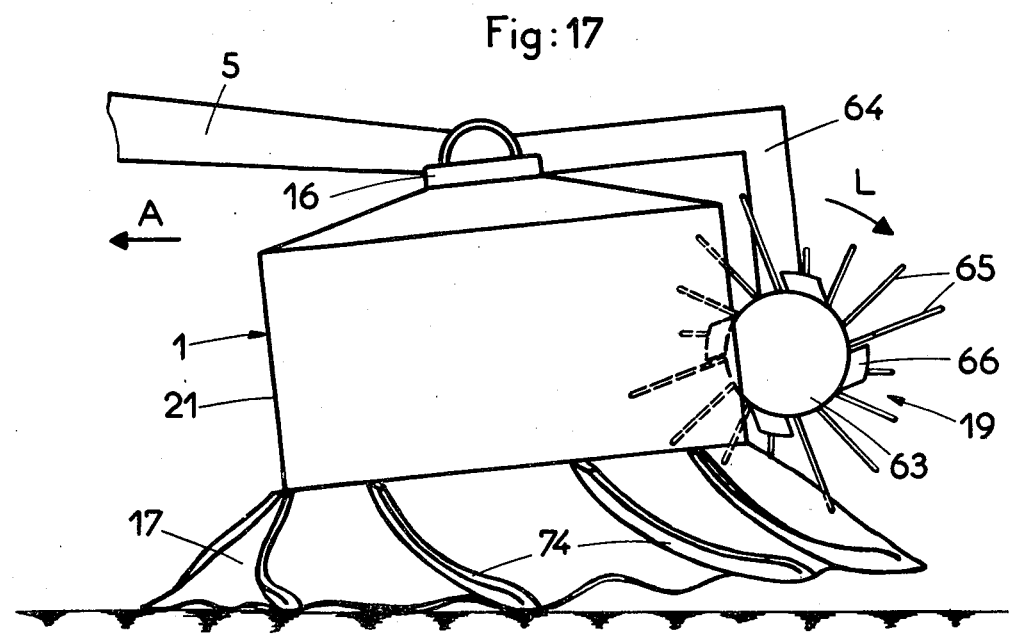
Fig: 17

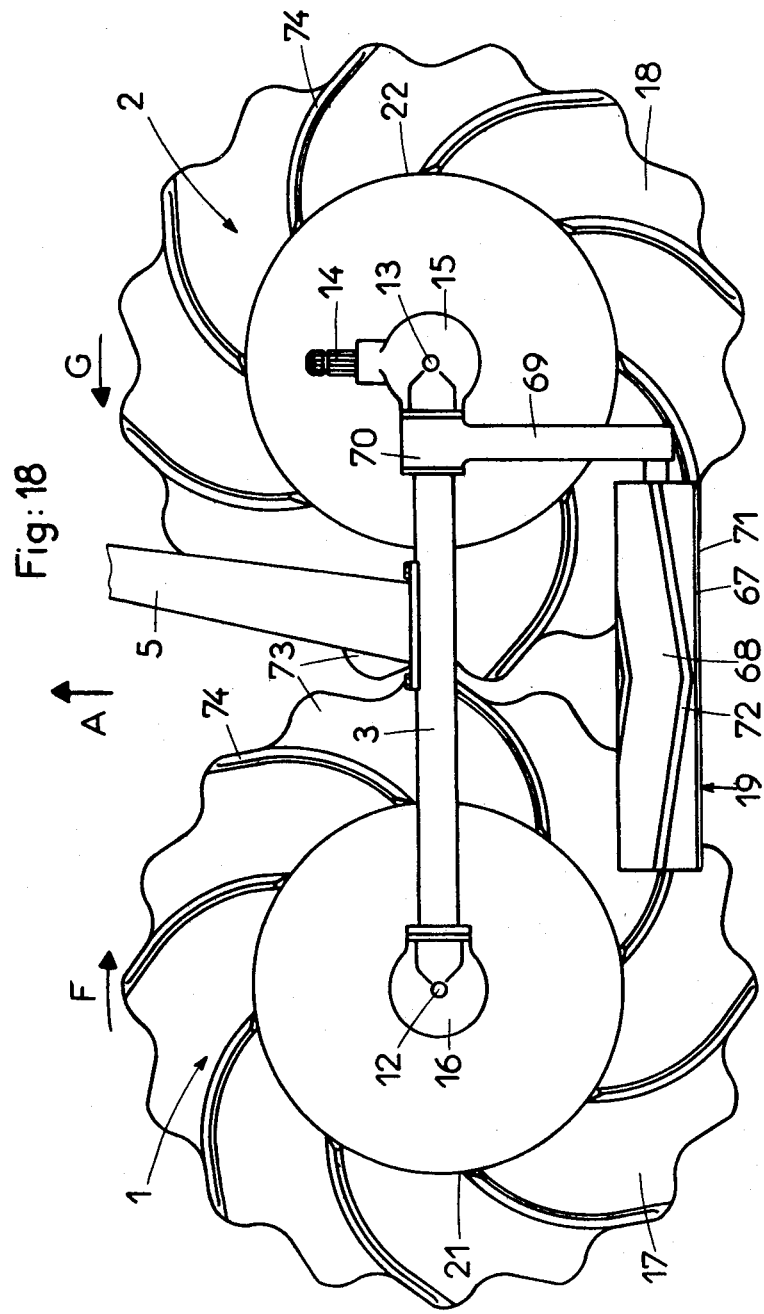

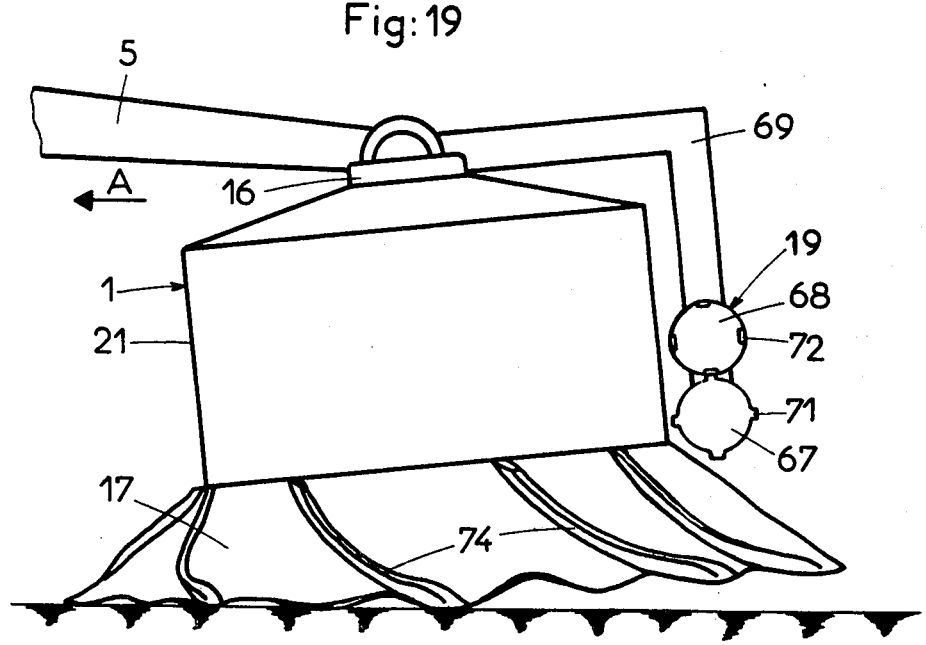

AGRICULTURAL MACHINE FOR THE TEDDING OR CONDITIONING OF FODDER

This is a continuation of application Ser. No. 215,854, filed Dec. 12, 1980 now U.S. Pat. No. 4,380,142.

The present invention relates to a haymaking machine comprising at least one drum which is rotated about a slightly forwardly inclined shaft and carries at its lower portion a flexible, deformable skirt for grasping and transporting the fodder.

A machine of this type makes it possible to carry out windrowing in a very effective manner. Thus, such a skirt plunges below the fodder to be displaced, whilst adapting well to ground level variations and transports the said fodder on its upper surface, which does not drag on the ground. As a result, the fodder is not soiled by the ground which may lead to rejection of the fodder by cattle. In addition, said flexible, deformable skirt is not aggressive relative to the cut fodder and young plant shoots. Furthermore, owing to the absence of metal forks which displace the fodder whilst scraping on the ground, it is possible to eliminate the danger constituted by broken forks for balers, ensilaging machines and self-loading trailers which are used for gathering up the fodder.

However, this machine is not really suitable for hay-tedding or conditioning of fodder. For these operations when the fodder is still generally green, it has to be treated in a much more vigorous manner and is preferably dispersed over a considerable width behind the machine.

The present invention aims to provide a haymaking machine with the aforementioned advantages and with which fodder can be tedded or conditioned.

According to the invention, there is provided a haymaking machine having at least one drum rotated about a shaft which is slightly forwardly inclined, the or each drum carrying in its lower portion a flexible, deformable skirt for grasping and transporting the fodder, wherein said skirt(s) is/are associated with tedding or conditioning means.

The tedding or conditioning means may comprise elements such as ribs located on the upper surface of the skirt(s). These elements grasp the fodder lifted up by the skirt(s), entrain it and spread it behind the machine, whilst turning it over.

The means associated with the drum skirt(s) for tedding or conditioning can also be entraining or drive means fixed, for example, to the wall of said drum(s). These drive means extend at least partly radially with respect to the drum(s). When working, the drive means, which rotate with the drum(s), spread the fodder taken up by the skirt(s) behind the machine.

In the case where the machine has two or more juxtaposed drums rotating in convergence, the conditioning of the fodder can be improved by bringing about the engagement of drive means of two adjacent drums.

The tedding or conditioning means can also be constituted by drive means fixed to a support located within the drum(s), whilst being offset with respect to the rotation shaft(s) of the latter. These drive means are operated in such a way that they extend to the maximum outside the drum(s) in the lateral part in contact with the fodder when working and on the rear part of said drum(s). They can consequently be very close to the skirt(s) without coming into contact with the ground in the front part of said drum(s).

The fodder tedding or conditioning means can also be spreaders positioned behind the drum(s). These spreaders are constituted by two rotors which are rotated and which spread behind the machine the fodder taken up by the drum skirt(s).

The tedding or conditioning means can also be formed by guide rods extending in mould-board form above the skirt(s). These rods turn over the fodder gathered up by the skirt(s) in much the same way as a plough.

The tedding or conditioning means can also be in the form of one or more substantially horizontal rotors positioned behind the drum(s). The rotor or rotors are provided with teeth and blades which cooperate for conditioning and spreading behind the machine the fodder gathered up by the skirt(s). These rotors can be replaced by conditioning rollers which bring about the bursting of the stems or blades in order to speed up the drying thereof.

In the case where the machine has at least two drums, an important feature of the invention is that their skirts are provided with projections meshing between the said drums. In this way, a partial overlapping of the trajectories described by the skirts is obtained and this ensures an integral gathering up of the fodder on the ground.

The invention will now be further described, by way of non limitative example, with reference to the drawings, which show:

FIG. 1: a plan view of a first embodiment of a machine according to the invention.

FIG. 2: a side view of the machine according to FIG. 1.

FIG. 3: a plan view of a second embodiment of a machine according to the invention.

FIG. 4: a side view of the machine according to FIG. 3.

FIG. 5: a constructional variant of the machine of FIG. 3.

FIG. 6: a side view of this variant.

FIGS. 7, 8 and 9: on a larger scale, different ways in which the entraining or drive means can be fixed to the drums of the machine according to the invention.

FIG. 10: a part sectional plan view of a third embodiment of a machine according to the invention.

FIG. 11: a part sectional side view of the machine of FIG. 10.

FIG. 12: a plan view of a fourth embodiment of a machine according to the invention.

FIG. 13: a side view of the machine of FIG. 12.

Figure 14:
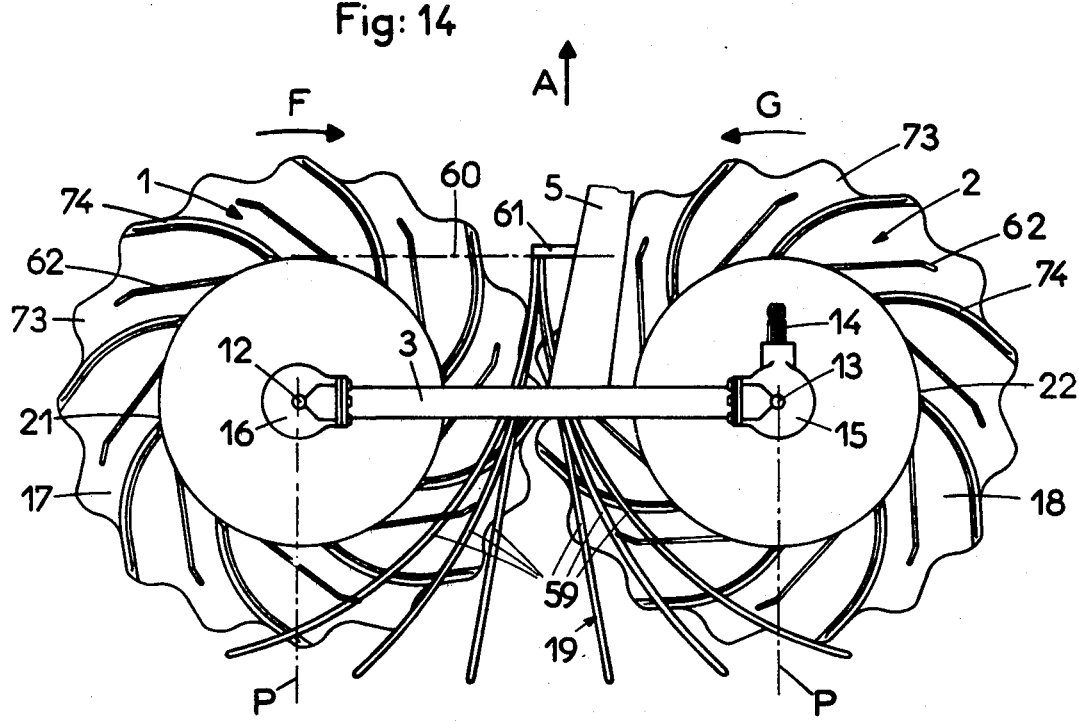

FIG. 14: a plan view of a fifth embodiment of a machine according to the invention.

Figure 15:
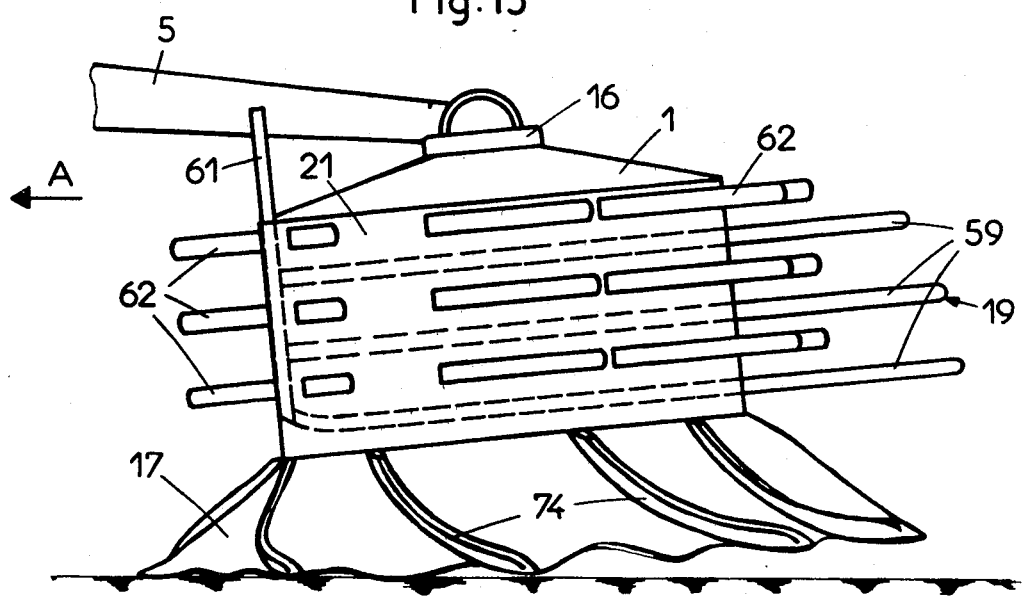

FIG. 15: a side view of the machine of FIG. 14.

FIG. 16: a plan view of a sixth embodiment of the machine according to the invention.

FIG. 17: a side view of the machine of FIG. 16.

FIG. 18: a plan view of a seventh embodiment of the machine according to the invention.

FIG. 19: a side view of the machine of FIG. 18.

As can be seen from the attached drawings, the machine according to the invention has two drums (1 and 2) interconnected by means of a chassis (3). This chassis is itself connected to a coupling member (4) by means of a connecting beam (5). The coupling member has two lower attachment points (6 and 7) and an upper attachment point (8) for coupling to the three-point linkage device of a not shown tractor. The position of coupling member (4) relative to connecting beam (5) can be defined by at least one cross-member (9). A small wheel (10, 11) can be provided beneath each drum (1, 2) to enable the machine to travel along the ground.

When working, drums (1, 2) are rotated in accordance with arrows (F, G) about slightly forwardly inclined shafts (12, 13), when viewed in the forward travel direction indicated by arrow (A). This driving action is obtained in per se known manner from the tractor power take-off shaft. The latter shaft is connected by means of a not shown cardan shaft to a grooved shaft end (14), which engages in a gear case (15) and drives drum (2) by means of a bevel gear and a toothed wheel located in said case. The second drum (1) is driven by means of a transmission shaft located in chassis (3). This shaft has at its end located in the gear case (15) a bevel gear which engages with the aforementioned toothed wheel and which at its other end extending into a gear case (16) surmounting the second drum (1) has a second bevel gear which engages with a toothed wheel fixed to the said drum (1).

In the lower part of each of the drums (1, 2) there is a flexible, deformable skirt (17, 18) for grasping and transporting the fodder. When working, said skirts (17, 18) plunge below the fodder to be displaced, whilst adapting well to ground level differences and transporting the fodder on their upper surface.

According to the present invention, means (19) are associated with skirt (17, 18) for the purpose of carrying out tedding or conditioning. Said means (19) are in contact with the fodder after the latter has been gathered up by skirts (17, 18). They then entrain or guide said fodder towards the rear of drums (1, 2) and again spread it on the ground whilst tedding and/or conditioning it.

In the embodiment of FIGS. 1 and 2, the means (19) are constituted by ribs (29) placed on the upper surface of skirts (17, 18). Ribs (20) extend from wall (21, 22) of drums (1, 2) up to the outer periphery of said skirts (17, 18), whilst being oriented in the rotation direction (F or G) of drums (1, 2). As a result of this orientation, ribs (20) engage well with the fodder and easily displace it rearwards. Ribs (20) are also advantageously curved in order to aid the sliding of the fodder towards walls (21, 22) of drums (1, 2). As a result, the fodder is further disengaged from the ground, which aids it spreading behind the machine. In order to produce a slight upward projection of the fodder, the rotation shafts (12, 13) of drums (1, 2) can be forwardly inclined by an angle (α) between 5° and 45°. This upward projection also aids the spreading of the fodder.

In the embodiment of FIGS. 3 and 4, the tedding or conditioning means (19) comprise entraining or drive means (23) fixed to the walls (21, 22) of drums (1, 2). These drive means are formed by rigid rods extending in substantially radial planes with respect to drums (1, 2). Their ends which are furthest from walls (21, 22) can however be slightly bent in the direction opposite to the rotation directions (F and G) of drums (1 and 2) to prevent the fodder from remaining engaged therewith. As can be more particularly gathered from FIG. 4, these drive means (23) are arranged at a number of levels. Those located in the two lower levels are directed downwards in order to be closer to skirts (17, 18). This enables them to better take up the fodder gathered up by the skirts. In this embodiment, the diameter (D) of the trajectory described by drive means (23) when working is smaller than the periphery of the skirts (17, 18) in order to prevent any contact with the ground, particularly in the front part of said trajectory.

The embodiment of FIGS. 5 and 6 differs from the aforementioned embodiment in that the diameter (E) of the trajectories described by the drive means (24) is larger than the periphery of skirts (17, 18) of drums (1, 2). Between drums (1, 2) there is a partial overlapping of these trajectories. Thus, the fodder is further conditioned during passage between the two drums. Due to their significant length, the lower drive means (24) are only slightly downwardly directed. This prevents them from coming into contact with the ground, particularly in the front part of their trajectory.

The drive means (23, 24) are advantageously fixed to the inner faces of the walls (21, 22) of the drums (1, 2). The drive means (23, 24) extend through holes (25) made in the said walls and have at their end located within the drums (1,2) a shoulder (26) having a larger diameter than that of the passage holes (25). Thus, in the case of disengagement or failure of the means for fixing the drive means (23,24), the latter would still be held by the walls (21,22), thereby preventing them from being lost in the fodder.

To this end, according to the embodiment of FIG. 7, the retaining plate (27) is welded to the drive means (23 or 24). This plate is also traversed by bolts (28) ensuring the fixing of the drive means (23,24) to the respective walls (21,22) of the drums (1,2).

In the embodiment of FIG. 8, the drive means (23 or 24) have a boss (29), whose diameter is greater than that of the passage hole (25). This boss is engaged in a bush (30) welded to the wall (21 or 22) of the drum (1 or 2). A pin (31) passing both through the bush (30) and the boss (29) of the drive means (23,24) ensures the fixing of the latter.

In FIG. 9, the drive means (23,24) are fixed by means of a pointed end screw (32) traversing a ring (33) welded to the wall (21,22) of the respective drum (1,2). Moreover, the drive means (23,24) have at the ends a retaining collar (34), whose diameter is greater than that of hole (25).

In the embodiment of FIGS. 10 and 11, the means (19) associated with skirts (17, 18) for tedding or conditioning purposes are constituted by drive means (35) articulated to supports (36) arranged within drums (1, 2) and which are offset with respect to the shafts (12, 13) of the latter. Supports (36) rotate freely on the said shafts. The latter form an elbow (37) at the position of said supports. Each of the supports (36) is constructed in two parts (38, 39), each of which has recesses (40) for receiving the inner ends of drive means (35). These ends are spherical so as to permit the orientation of drive means (35) with respect to supports (36) during the rotation of drums (1, 2). The drive means (35) pass through ball joints (41) located on walls (21, 22) of drums (1, 2). As can be gathered from FIG. 10, each support (36) is positioned in the rear quarter (42) of its drums (1, 2) which is closest to the passage of the fodder when the latter is displaced towards the rear of the machine. As a result of this positioning, drive means (35) project to the maximum out of drums (1, 2) in said rear quarter (42). In this area, they engage well there with the fodder enabling them to ted and spread the said fodder to the rear of the machine. However, drive means (35) are largely positioned within the drums (1, 2) over the front part of the latter. Therefore, the lower-drive means (35) can be very close to skirts (17, 18) without there being any risk of their touching the ground in the front part of their trajectory. When working, each support (36) is rotated by means of a spring (43) connecting it to the corresponding drum (1, 2).

The fodder tedding or conditioning means can also be constituted by spreaders (44) positioned behind the drums (1, 2). As shown in FIGS. 12 and 13, these spreaders are formed by two rotors (45,46) interconnected by means of a beam (47), which is itself connected to the support chassis (3) of drums (1, 2) by means of a beam (48). Rotors (45, 46) are provided with radial teeth (49, 50), whose trajectories partly overlap. In order to prevent any collision between said teeth (49, 50), they are advantageously displaced in a heightwise manner with respect to the ground. When working, rotors (45, 46) are rotated so as to turn in convergence at the front, viewed in the forward travel direction (A), as from drums (1, 2). To this end, each of the drums has a pulley (51, 52) over which passes a belt (53, 54). Each belt (53, 54) also passes over a pulley (55, 56) provided on rotors (45, 46). The rotation spindles (57, 58) of rotors (45, 46) are substatially parallel to the shafts (12, 13) of drums (1, 2). However, said spindles (57,58) can also be slightly forwardly or laterally inclined in order to obtain a projection of the fodder in a certain direction.

When working, the rotors (45, 46) intercept the fodder transported rearwards by skirts (17, 18) of drums (1, 2). This fodder is then conditioned whilst passing between the two rotors (45, 46) which again spread it behind the machine.

In the embodiment according to FIGS. 14 and 15, guide rods (59) are provided for tedding or conditioning the fodder. These rods extend substantially from a line (60) tangential to the front part of drums (1, 2) to the rear of the latter in the form of a mouldboard. At their front end, they are fixed to a support (61) connected to beam (5), connecting the chassis (3) and the coupling member (4). Rods (59) are arranged at several of levels. Those of the upper level extend to the rear of drums (1, 2), preferably beyond a plane (P) parallel to the forward travel direction (A) and pass through the rotation shaft (12 or 13) of said drums. When working, the fodder gathered up by skirts (17, 18) slides along the rods (59) towards the rear of the machine. This displacement is aided by means of strips (62) fixed to walls (21, 22) of drums (1, 2) which move the fodder. As the latter slides rearwards, it is turned over by rods (59) and falls onto the ground. The friction between the fodder and rods (59) brings about the bursting of the protective film of the stalks or blades forming the fodder, which speeds up the drying thereof.

In the embodiment of FIGS. 16 and 17, the tedding or conditioning means are constituted by a rotor (63) positioned behind drums (1, 2). Rotor (63) is connected to chassis (3) by a bent arm (64) in which are housed not shown means for rotating the rotor in the direction of arrow (L). These means can, for example, be notched belts or chains. Rotor (63) is provided with the teeth (65) which take up the fodder gathered up by skirts (17 and 18), as well as blades (66) having a ventilating action and bringing about the dispersion of the fodder behind the machine. To this end, the blades (66) positioned on the same side with respect to the median plane (M) of rotor (63) are preferably oriented towards the corresponding end of the rotor. The length of teeth (65) varies as a function of the profile of the skirts (17, 18) in order to facilitate the taking up of the fodder from said skirts. Thus, teeth (65) in the middle part of rotor (63) are longer than those close to its ends. Furthermore, teeth (65) are oriented slightly in the direction opposite to the rotation direction (L) of rotor (63) to prevent them holding back the fodder. It is advantageously possible to provide a second rotor substantially parallel to rotor (63), which cooperates with the latter to improve the conditioning action.

The machine according to FIGS. 18 and 19 is provided with two conditioning rollers (67, 68) positioned behind drums (1, 2) and connected to chassis (3) by means of a bent arm (69). This arm advantageously houses drive means such as toothed wheels ensuring the rotation of the rollers from a gear case (70). When working, they are driven so as to turn in convergence at the front, viewed in the forward travel direction of the machine. The fodder from skirts (17, 18) consequently passes between said two rollers (67, 68) which bend and flatten the stalks or blades in order to accelerate the evaporation of the water. This effect is improved by means of ribs (71) on roller (67) and cavities (72) with the same profile provided on the other roller (68). After passing between the rollers (67,68) the fodder again drops onto the ground in the form of a well ventilated layer.

According to another feature of the invention, the skirts (17, 18) of drums (1, 2) are peripherally provided with projections (73) which engage between the drums. This leads to a slight overlapping of their trajectories, ensuring an integral gathering up of the fodder. In addition, these projections (73) aid the gathering up of the fodder. Thus, when working, they to some extent separate the fodder from the ground and assist its passage onto skirts (17, 18).

In the embodiments of FIGS. 3 to 19, the upper surface of skirts (17, 18) is provided with ribs (74) extending the direction opposite to the rotation direction (F or G) as from walls (21, 22) of drums (1, 2). These ribs (74) assist the gathering up and displacement of the fodder.

It is obvious that numerous improvements, modifications or additions can be made to the embodiments described in non-limitative and exemplified manner hereinbefore, whilst certain components can be replaced by technical equivalents without passing beyond the scope of the invention.

We claim:

1. In a machine for tedding cut herbage during forward movement of the machine on the ground,
in combination:
a support,
at least two drums each mounted on said support for rotation about an axis which is inclined upwardly and forwardly in respect of the direction of movement of the machine,
driving means operable for rotating said drums about said axis,
flexible deformable skirts having an outer diameter and an inner diameter separated by a predetermined width and mounted on the lower portion of said drum for joint rotation therewith, and operative for lifting the cut herbage and moving it rearwardly,
said skirts being provided with peripheral projections, the peripheral projections of one of said skirts intermeshing operatively with the peripheral projections of the other skirt, and
tedding means cooperating with said skirts for tedding the lifted herbage prior to its deposition on the ground,
said tedding means including a plurality of ribs provided on the upper surface of said skirt and extending from said drum to the outer periphery of said skirts while being oriented in the direction of rotation of said drum.

2. In a machine for tedding cut herbage during forward movement of the machine on the ground, in combination:
a support,
at least two drums each mounted on said support for rotation about an axis which is inclined upwardly and forwardly in respect of the direction of movement of the machine,
driving means operable for rotating said drums about said axis,
flexible deformable skirts having an outer diameter and an inner diameter separated by a predetermined width and mounted on the lower portion of said drums for joint rotation therewith, and operative for lifting the cut herbage and moving it rearwardly,
said skirts being provided with peripheral projections, the peripheral projections of one of said skirts intermeshing operatively with the peripheral projection of the other skirt, and
tedding means cooperating with said skirts for tedding the lifted herbage prior to its deposition on the ground,
said tedding means including impelling means extending substantially over the entire width of said skirt,
and further comprising means for securing said impelling means to said drums.

3. A machine as defined in claim 2, wherein said impelling means include a plurality of impelling elements which are arranged at several levels relative to said drums, those impelling elements which are located at the lower levels being slightly downwardly and outwardly inclined.

4. A machine as defined in claim 2, wherein the diameter of the trajectory of movement of said impelling means is larger than that of the periphery of said skirts.

5. A machine as defined in claim 4, wherein the trajectories of movement of said impelling means of the drums partly overlap one another at a region between said drums.

6. A machine as defined in claim 2, wherein each drum is hollow and includes a peripheral wall circumferentially surrounding the interior of said drum; and further comprising means for fixing said impelling means to said peripheral wall at the internal surface thereof.

7. A machine as defined in claim 6, wherein said peripheral wall is perforated and said impelling means extends through said perforated wall from the exterior into the interior of said drum, said impelling means having at its portion situated within the drum a shoulder having a diameter greater than that of the perforation through which such impelling means extends.

8. In a machine for tedding cut herbage during forward movement of the machine on the ground,
in combination:
a support,
at least two drums, each having a peripheral wall and a predetermined height, each of said drums being mounted on said support for rotation about an axis which is inclined upwardly and forwardly in respect of the direction of movement of the machine,
driving means operable for rotating said drums about said axis,
a flexible deformable skirt having an outer diameter and an inner diameter separated by a predetermined width and mounted on the lower portion of each drum for join rotation therewith, and operative for lifting the cut herbage and moving it rearwardly,
said skirts being provided with peripheral projections, the peripheral projections of one of said skirts intermeshing operatively with the peripheral projections of the other skirt, and
tedding means cooperating with said skirts for tedding the lifted herbage prior to its deposition on the ground,
said tedding means including two spreaders, each being situated rearwardly above a respective of said drums, and each having a plurality of teeth extending above a respective of said skirts substantially up to said peripheral wall within the region of said predetermined height.

9. In a machine for tedding cut herbage during forward movement of the machine on the ground,
in combination:
a support,
at least two drums each mounted on said support for rotation about an axis which is inclined upwardly and forwardly in respect of the direction of movement of the machine,
driving means operable for rotating said drums about said axis,
flexible deformable skirts having an outer diameter and an inner diameter separated by a predetermined width and mounted on the lower portion of said drums for joint rotation therewith, and operative for lifting the cut herbage and moving it rearwardly,
said skirts being provided with peripheral projections, the peripheral projections of one of said skirts intermeshing operatively with the peripheral projections of the other skirt, and
tedding means cooperating with said skirt for tedding the lifted herbage prior to its deposition on the ground,
said tedding means including guide rods disposed at several levels relative to said drums and extending from a line substantially tangential to the front part of said drums to a zone rearwardly of said drums along an imaginary surface resembling that of a mold board, and wherein the guide rod which is situated at the highest of said levels extends from said line rearwardly of said drums beyond a plane extending parallel to the direction of movement of the machine and passing through the axis of rotation of said drums,
said tedding means further including strips fixed to the drums, said strips extending partly between the guide rods.

10. In a machine for tedding cut herbage during forward movement of the machine on the ground,
in combination:
a support,
at least two drums, each mounted on said support for rotation about an axis which is inclined upwardly and forwardly in respect of the direction of movement of the machine,
driving means operable for rotating said drums about said axis,
a flexible deformable skirt having a predetermined profile, and mounted on the lower portion of each drum for joint rotation therewith, and operative for lifting the cut herbage and moving it rearwardly, said skirts being provided with peripheral projections, the peripheral projections of one of said skirts intermeshing operatively with the peripheral projections of the other skirt, and tedding means cooperating with said skirts for tedding the lifted herbage prior to its deposition on the ground, said tedding means including at least one rotor mounted rearwardly of said drums for rotation about a substantially horizontal axis, said rotor being provided with outwardly extending teeth the length of which varies as a function of the profile of said skirts.

11. A machine as defined in claim 10, wherein the length of said teeth increases in a direction toward the center of said rotor.

12. A machine as defined in claim 10, wherein said rotor has a predetermined direction of rotation and wherein said teeth are inclined in a direction opposite to said predetermined direction of rotation.

13. A machine as defined in claim 10, wherein said rotor defines a median plane substantially at right angles with said horizontal axis and includes outwardly projecting blades which are oriented at each side of said median in directions toward the respective ends of said rotor.

14. In a machine for tedding cut herbage during forward movement of the machine on the ground,
in combination:
a support,
at least two drums each mounted on said support for rotation about an axis which is inclined upwardly and forwardly in respect of the direction of movement of the machine,
driving means operable for rotating said drums about said axis,
flexible deformable skirts having an outer diameter and an inner diameter separated by a predetermined width and mounted on the lower portion of said drums for joint rotation therewith, and operative for lifting the cut herbage and moving it rearwardly,
said skirts being provided with peripheral projections, the peripheral projections of one of said skirts intermeshing operatively with the peripheral projections of the other skirts, and
tedding means cooperating with said skirts operative for tedding the lifted herbage prior to its deposition on the ground.

* * * * *